3,299,152
PREPARATION OF ALPHA, OMEGA-
DICHLOROOLEFIN
Yanosuke Inaba, Fujisawa, Kanagawa, and Goro Kimura
and Takushi Uematsu, Kamakura, Kanagawa, Japan,
assignors to Toyo Koatsu Industries, Inc., Tokyo, Japan,
a corporation of Japan
No Drawing. Filed Oct. 11, 1962, Ser. No. 229,997
Claims priority, application Japan, Nov. 6, 1961,
36/39,489
9 Claims. (Cl. 260—654)

This invention relates to a process for preparation of alpha, omega-dichloroolefins comprising the selective isolation of the secondary chlorine as hydrogen chloride from trichloroalkanes having the formula

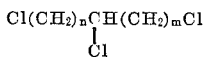

wherein $m$ and $n$ are integers equal to or greater than 2 and $m+n$ is an integer of 4 to 9.

Extensive prior art researches have been conducted in regard to dehydrohalogenations of haloalkanes, especially in connection with processes for preparation of vinyl chloride. However, most of these prior art researches have been confined to relatively low halo-alkanes having 2–3 carbon atoms and involved the use of alkaline reagents and/or water. The process of the present invention, however, is entirely unknown wherein only the secondary chlorine atom in the straight-chain higher trichloroalkane having 5–10 carbon atoms is selectively removed as hydrogen chloride, allowing the primary terminal chlorine atoms to remain.

It is an object of this invention to provide a process for preparing alpha, omega-dichloroolefins, i.e., alpha, omega-dichloroalkenes having 5–10 carbon atoms, in high yields by selectively removing only the secondary chlorine of trichloroalkanes as hydrogen chloride.

The process according to the present invention is carried out, as shown in the following equation, by contacting a trichloroalkane of the type described above, as the starting material, at a temperature of about 160° C. to less than about 250° C., with a catalyst, whereby only the secondary chlorine together with a hydrogen atom of the adjoining methylene radical are selectively removed as hydrogen chloride to obtain alpha, omega-dichloroolefin.

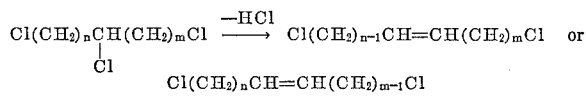

wherein $m$, $n$ and $m+n$ are as defined above. The catalyst employed in this process is selected from the following two classes:

(1) Charcoal, activated carbon, pumice, silica gel, alumina, or mixtures thereof.

(2) Charcoal, activated carbon, pumice, silica gel, alumina, or mixtures thereof impregnated with at least one metal chloride selected from NaCl, KCl, AgCl, $Cu_2Cl_2$, $CuCl_2$, $BaCl_2$, $ZnCl_2$, $TiCl_4$, $ZrCl_4$, $SnCl_4$ and $FeCl_3$.

In carrying out this reaction the following methods may be used:

(1) The method of contacting liquid trichloroalkane with the catalyst by agitation at the specified temperatures.

(2) The method of contacting the vapor or mist of trichloroalkane with the catalyst by passing it, at the specified temperatures, together with an inert gas such as $N_2$ through a reaction column filled with the catalyst.

(3) The method set forth in (2) above wherein the trichloroalkane is gasified under reduced pressure and is contacted with the catalyst by passing the gasified trichloroalkane without an inert gas through a reaction column at the specified temperatures.

In any of the methods described above, hydrogen chloride generated is immediately removed from the reaction system, and by fractionating the reaction product after the reaction is completed, alpha, omega-dichloroolefin is obtained in a high yield together with a small amount of a low boiling by-product and unreacted trichloroalkane. The low boiling by-product, in this case, is about 1–2% based on the starting material employed and comprises hydrocarbons having various numbers of carbon atoms and different halogen contents.

As the reaction is very susceptible to reaction temperatures, the composition of the product varies greatly depending upon the particular reaction temperatures employed. When the above-mentioned reaction is carried out at about 250° C. to about 300° C. not only the desired secondary chlorine atoms but also primary chlorine atoms are removed, resulting in a decrease in yield of the desired alpha, omega-dichloroolefin of about 20 to 30%. When the reaction is conducted at temperatures higher than about 300° C. the breakage of carbon-carbon bonds becomes very pronounced. A decomposition reaction takes place in which carbon is deposited on the catalyst and any material balance is entirely destroyed, resulting in a decrease in yield of the desired alpha, omega-dichloroolefin to less than 10%.

Accordingly, the process of this invention is characterized by lower temperatures than in any case in the prior art catalytic dehydrochlorinations and makes possible not only the selective removal of secondary chlorine atoms of trichloroalkanes but also permits the control and substantial elimination of side reactions, such as, decomposition or polymerization. The process is also characterized by the complete absence of any necessity to use water.

The optimum reaction temperature depends, of course, on the number of methylene radicals of trichloroalkane. The optimum reaction temperatures, for example, are as follows: About 220° C. to about 230° C. in the preparation of 1,6-dichlorohexene-3 from 1,4,6-trichlorohexane; about 200° C. to about 210° C. in the preparation of 1,7-dichloroheptene-3 from 1,4,7-trichloropentane; and about 180° C. to about 190° C. in the preparation of 1,9-dichlorononene-3 from 1,4,9-trichlorononane.

The process will be further illustrated in conjunction with the following specific examples. It is to be understood, however, that the examples are given for the purpose of illustration and not by way of limitation.

*Example 1*

A reaction column, made of quartz, with a diameter of 20 mm. and a length of 500 mm. and equipped with two inlets at the upper end and an outlet at the other end and covered with Nichrome wire on the outside was electrically heated while it was maintained vertically. 100 cc. of activated carbon of 5–10 mesh was charged to this reaction column. The outlet of the reaction column was connected to a spiral cooler whose lower end was connected to a cold trap provided with a gas exhaust port. The cold trap was cooled with ice water.

Through one of the inlets at the upper end of the reaction column, heated $N_2$ gas was introduced at the rate of 100 cc./min. and, through the other inlet, 100 g. of heated 1,4,7-trichloroheptane, which had been passed through a preheater, was introduced for 3 hours while the reaction column was maintained at 210° C.

After the completion of the reaction the product collected in the cold trap was distilled under reduced pressure to obtain 37.7 g. of 1,7-dichloroheptene-3 together with 2.4 g. of a low boiling by-product and 47.2 g. of unreacted 1,4,7-trichloroheptane. The conversion rate of 1,4,7-trichloroheptane to 1,7-dichloroheptene-3 was 52.8% and the yield of 1,7-dichloroheptene-3 based on the reacted trichloroheptane was 87.0% for one passage of the gas through the reaction column.

Example 2

100 g. of 1,4,7-trichloroheptane were introduced into a reaction column similar to the one used in Example 1 and exactly the same operation as mentioned in Example 1 was employed, except that the reaction temperature was about 200° C. and the catalyst, charged to the said reaction column, comprised 100 cc. of a mixture of equal amounts of activated carbon and pumice of 3–6 mesh impregnated with 10% (by weight) of $BaCl_2$ based on the mixture. There was obtained 71.6 g. of 1,7-dichloroheptene-3 together with 1.2 g. of a low boiling by-product and 5.3 g. of unreacted 1,4,7-trichloroheptane. The yield of 1,7-dichloroheptene-3 based on the reacted 1,4,7-trichloroheptane was 92.3%.

Example 3

100 g. of 1,4,7-trichloroheptane were introduced into a reaction column similar to the one used in Example 1 and the same operation as mentioned in Example 1 was employed, except that the reaction temperature was about 180° C. and the catalyst, charged to the said reaction column, comprised 140 cc. of pumice of 3–8 mesh impregnated with 10% (by weight) of $CaCl_2$ based on said pumice. There was recovered 12.4 g. of unreacted 1,4,7-trichloroheptane and there was obtained 2.4 g. of a low boiling by-product and 62.9 g. of 1,7-dichloroheptene-3. The yield of 1,7-dichloroheptene-3 based on the reacted 1,4,7-trichloroheptane was 86.4%.

Example 4

A column type rectifying tower with a diameter of 20 mm. and a length of 40 mm. employing reduced pressure apparatus was set up in the conventional manner. 100 cc. of a catalyst, comprising charcoal of 2½–4 mesh impregnated with 1% (by weight) of KCl and 5% (by weight) of $ZrCl_4$ based on said charcoal and dried at 110° C. for 5 hours, were charged to the column and its outside was covered with Nichrome wire which served as a heater. The packed column was heated at 180° C. and 100 g. of 1,4,7-trichloroheptane were placed in a flask connected to the lower end of the column. After reducing the pressure of the reaction system to 20 mm. Hg by a tap aspirator, the 1,4,7-trichloroheptane was distilled through the packed column.

As the 1,4,7-trichloroheptane passed through the layers of the catalyst, the product coming from the column was cooled and collected in a receiver and again rectified to obtain 0.7 g. of a low boiling by-product, 3.7 g. of unreacted 1,4,7-trichloroheptane and 75.1 g. of 1,7-dichloroheptene-3. The yield of 1,7-dichloroheptene-3 based on the reacted 1,4,7-trichloroheptane was 95.2%.

Example 5

Exactly the same operation as in Example 1 was employed, except that the reaction temperature was 250° C., and the catalyst, charged in a reaction column similar to the one used in Example 1, comprised about 140 cc. of a mixture of pumice (1 weight part) and activated alumina (2 weight parts) of 5–8 mesh. 100 g. of 1,4,9-trichlorononane used as a starting material obtained 17.2 g. of 1,9-dichlorononene-3 together with 21.8 g. of a low boiling by-product and 7.2 g. of unreacted 1,4,9-trichlorononane. The yield of 1,9-dichlorononene-3 based on the reacted 1,4,9-trichlorononane was 21.95%.

Example 6

Exactly the same operation as in Example 1 was employed except the reaction temperature was 190° C. and the catalyst, charged in a reaction column similar to the one used in Example 1, comprised 140 cc. of a mixture of activated carbon (1 weight part) and activated alumina (1 weight part) of 3–8 mesh impregnated with 10% (by weight) of $CuCl_2$ based on the mixture. 100 g. of 1,4,9-trichlorononane was used as starting material to obtain 1.3 g. of a low boiling by-product, 6.2 g. of unreacted 1,4,9-trichlorononane and 73.7 g. of 1,9-dichlorononene-3. The yield of 1,9-dichlorononene-3 based on reacted 1,4,9-trichlorononane was 93%.

While this invention has been described with reference to alpha, omega-dichloroolefins, it is equally applicable in substantially all respects to the manufacture of any alpha, omega-dihaloolefin from the corresponding trihaloalkane, e.g., alpha, omega-dibromoolefins from the corresponding tribromoalkane.

The trihaloalkane starting materials employed herein can be made in any convenient manner. An advantageous method of preparing trihaloalkanes is described in a copending application, Serial No. 230,004, filed October 11, 1962, now U.S. Patent 3,246,042, and comprises the reaction of hydrogen halide with alpha-tetrahydrofuryl alkylhalide in the presence of more than one mol of water per mol of alpha-tetrahydrofuryl alkylhalide, in the presence of a metal halide catalyst, e.g., zinc chloride, and at a temperature of 70° C. to 115° C. to form the trihaloalkane.

The alpha, omega-dichloroolefins produced by the present invention are useful as polymerizable monomers, alone or in conjunction with other olefinic monomers, e.g., styrene or vinyl chloride, in the presence of peroxide catalysts, to form resinous materials which can be employed as protective coatings or plastic films.

What is claimed is:

1. Process for making alpha, omega-dihaloolefins comprising contacting a trihaloalkane of the formula:

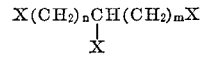

wherein X is chlorine or bromine, $m$ and $n$ each is an integer equal to at least 2 and $m+n$ is an integer from 4 to 9, as sole ingredient, with a catalyst from the class consisting of charcoal, activated carbon, pumice, silica gel, alumina and mixtures thereof at a temperature of 160° C. to about 250° C. to selectively remove the secondary halogen atom and to form the corresponding alpha, omega-dihaloolefin.

2. Process as claimed in claim 1 wherein said catalyst is impregnated with at least one metal chloride selected from the class consisting of NaCl, KCl, AgCl, $Cu_2Cl_2$, $CuCl_2$, $BaCl_2$, $ZnCl_2$, $TiCl_4$, $ZrCl_4$, $SnCl_4$ and $FeCl_3$.

3. Process for making alpha, omega-dichloroolefins as claimed in claim 1 wherein said trihaloalkane is a trichloroalkane and X is chlorine.

4. Process for making alpha, omega-dichloroolefins as claimed in claim 2 wherein said trihaloalkane is a trichloroalkane and X is chlorine.

5. Process for making 1,7-dichloroheptene-3 as claimed in claim 3 wherein said trichloroalkane is 1,4,7- trichloroheptane, said catalyst is activated carbon and said temperature is 200° C. to 210° C.

6. Process for making 1,7-dichloroheptene-3 as claimed in claim 4 wherein said trichloroalkane is 1,4,7-trichloroheptane and said catalyst is a mixture of activated carbon and pumice impregnated with barium chloride.

7. Process for making 1,7-dichloroheptene-3 as claimed in claim 4 wherein said trichloroalkane is 1,4,7-trichloroheptane and said catalyst is pumice impregnated with calcium chloride.

8. Process for making 1,7-dichloroheptene-3 as claimed in claim 4 wherein said catalyst is charcoal impregnated with a mixture of potassium chloride and zirconium chloride.

9. Process for making 1,9-dichlorononene-3 as claimed in claim 4 wherein said trichloroalkane is 1,4,9-trichlorononane and said catalyst is a mixture of activated carbon and activated alumina impregnated with cupric chloride.

References Cited by the Examiner
UNITED STATES PATENTS 2,410,541  11/1946  Joyce _____ 260—654

OTHER REFERENCES

Morrison et al.: Organic Chemistry, (1959, pp. 122).

LEON ZITVER, *Primary Examiner.*

K. V. ROCKEY, *Assistant Examiner.*